United States Patent
Kinpara et al.

(10) Patent No.: US 12,034,468 B2
(45) Date of Patent: Jul. 9, 2024

(54) ANTENNA WIRELESS DEVICE

(71) Applicant: Panasonic Corporation, Osaka (JP)

(72) Inventors: Tomoyuki Kinpara, Miyagi (JP); Taiji Akizuki, Miyagi (JP); Kazuya Toki, Miyagi (JP); Takayuki Sotoyama, Kanagawa (JP); Naoki Adachi, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 336 days.

(21) Appl. No.: 17/707,178

(22) Filed: Mar. 29, 2022

(65) Prior Publication Data

US 2022/0321161 A1 Oct. 6, 2022

(30) Foreign Application Priority Data

Mar. 31, 2021 (JP) .................... 2021-060324

(51) Int. Cl.
| | |
|---|---|
| *H04B 1/40* | (2015.01) |
| *H01P 5/18* | (2006.01) |
| *H01Q 21/00* | (2006.01) |
| *H01Q 21/06* | (2006.01) |
| *H04B 1/04* | (2006.01) |
| *H04B 1/38* | (2015.01) |

(52) U.S. Cl.
CPC .............. *H04B 1/40* (2013.01); *H01P 5/18* (2013.01); *H01Q 21/0025* (2013.01); *H01Q 21/065* (2013.01); *H04B 1/04* (2013.01)

(58) Field of Classification Search
CPC ... H04B 1/40; H04B 1/04; H04B 1/38; H04B 7/02; H04B 7/04; H01P 5/18; H01Q 21/065; H01Q 21/24
See application file for complete search history.

(56) References Cited

U.S. PATENT DOCUMENTS

| | | | |
|---|---|---|---|
| 10,784,566 B1 * | 9/2020 | Chang .................... | H01Q 1/525 |
| 2001/0043130 A1 | 11/2001 | Nagamori et al. | |
| 2009/0267824 A1 * | 10/2009 | Cooper .................. | H01Q 3/267 |
| | | | 342/174 |

(Continued)

FOREIGN PATENT DOCUMENTS

| | | |
|---|---|---|
| JP | 2002-43813 A | 2/2002 |
| JP | 2010-263632 A | 11/2010 |

*Primary Examiner* — Andrew Wendell
(74) *Attorney, Agent, or Firm* — Seed IP Law Group LLP

(57) ABSTRACT

An antenna wireless device includes: antenna elements; feed ports respectively corresponding to the antenna elements; one or more detection ports each corresponding to some or all of the plurality of antenna elements; transceiver circuits respectively connected to feed ports; and one or more reference transceiver circuits each connected to a corresponding one or more of the one or more detection ports. For each antenna element, the transceiver circuit processes a first signal to generate a second signal, the second signal fed to the feed port is output to the reference transceiver circuit through the detection port, the reference transceiver circuit processes the second signal to generate a third signal, and detects an amplitude and phase deviation based on the first signal and the third signal, and the transceiver circuit adjusts a phase and an amplitude of a transmission signal based on the amplitude and phase deviation.

10 Claims, 8 Drawing Sheets

(56) References Cited

U.S. PATENT DOCUMENTS

| | | | |
|---|---|---|---|
| 2016/0049995 A1* | 2/2016 | André | H04B 17/14 |
| | | | 370/277 |
| 2016/0308563 A1* | 10/2016 | Ouyang | H01Q 25/005 |
| 2016/0372828 A1* | 12/2016 | Geis | H03G 3/00 |
| 2017/0237454 A1* | 8/2017 | Weissman | H03F 3/24 |
| | | | 375/297 |
| 2018/0115371 A1* | 4/2018 | Trotta | H04B 1/38 |
| 2020/0411981 A1* | 12/2020 | Kimball | H04B 1/44 |
| 2022/0255216 A1* | 8/2022 | Zhao | H01Q 3/06 |

* cited by examiner

ANTENNA WIRELESS DEVICE

BACKGROUND

1. Technical Field

The present disclosure relates to an antenna wireless device.

2. Background Art

An antenna wireless device including a detector disposed immediately following a transmission power amplifier is known (see, for example, Unexamined Japanese Patent Publication No. 2010-263632).

SUMMARY

However, in the conventional configuration, since the detector detects a difference in transmission characteristics of a transmission path through which signals pass until being input to an antenna element, an error will be included in detected values, due to differences in temperatures and in line lengths, between the antenna element and the detector. Consequently, such a conventional configuration has a problem in that beamforming accuracy decreases.

One non-limiting and exemplary embodiment facilitates providing an antenna wireless device capable of being driven with higher beamforming accuracy.

An antenna wireless device according to one exemplary embodiment of the present disclosure includes: a plurality of antenna elements on a substrate; feed ports each associated with a corresponding one of the plurality of antenna elements; one or more detection ports each associated with a corresponding at least one or all of the plurality of antenna elements; transceiver circuits each connected to a corresponding one of the feed ports; and one or more reference transceiver circuits each connected to a corresponding one or a corresponding plurality of the detection ports of the one or more detection ports. For each antenna element of the plurality of antenna elements, a corresponding transceiver circuit of the transceiver circuits subjects a first signal to transmission processing including digital to analog conversion and up-conversion to generate a second signal, and feeds the second signal to a corresponding feed port of the feed ports, the corresponding feed port being connected to the corresponding transceiver circuit, the second signal fed to the corresponding feed port is output to a corresponding reference transceiver circuit of the one or more reference transceiver circuits through a corresponding detection port of the one or more detection ports, the corresponding reference transceiver circuit being connected to the corresponding detection port, the corresponding detection port being associated with the antenna element with which the corresponding feed port is associated, the corresponding reference transceiver circuit subjects the second signal to processing including analog to digital conversion and down-conversion to generate a third signal, detects a first amplitude and phase deviation based on the first signal and the third signal, and outputs the first amplitude and phase deviation to the corresponding transceiver circuit, and the corresponding transceiver circuit adjusts a phase and an amplitude of a transmission signal based on the first amplitude and phase deviation.

It should be noted that general or specific embodiments may be implemented as a system, a method, an integrated circuit, a computer program, a storage medium, or any selective combination thereof.

According to one exemplary embodiment of the present disclosure, it is possible to correct a difference in path characteristics between the antenna element and the detector which, in operation, detects an amplitude and phase deviation. Thus, the antenna wireless device can be driven with higher beamforming accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, exemplary embodiments of the present disclosure will be described in detail with reference to the accompanying drawings as appropriate. However, a more detailed description than necessary may be omitted. For example, the detailed description of already well-known matters and the redundant description of configurations substantially identical to already-described configurations may be omitted. This is to avoid the following description from being unnecessarily redundant, and to help those skilled in the art easily understand the description.

Note that, the accompanying drawings and the following description are provided for those skilled in the art to fully understand the present disclosure, and are not intended to limit the subject matter described in the claims.

First Exemplary Embodiment

<Configuration of Antenna Wireless Device>

Figure 1:
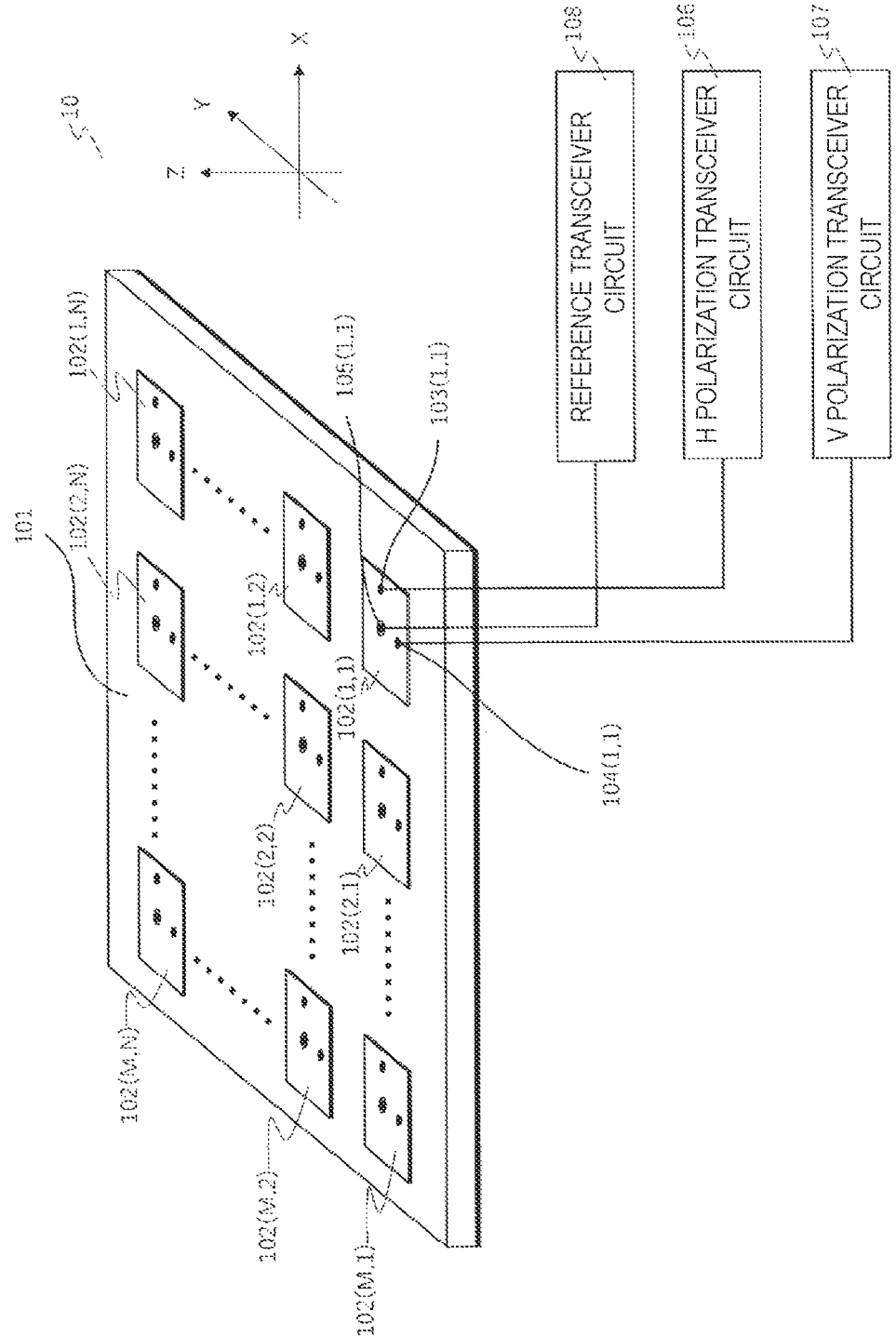
FIG. 1 is a block diagram illustrating an example of an antenna wireless device according to a first exemplary embodiment of the present disclosure.
Figure 2:
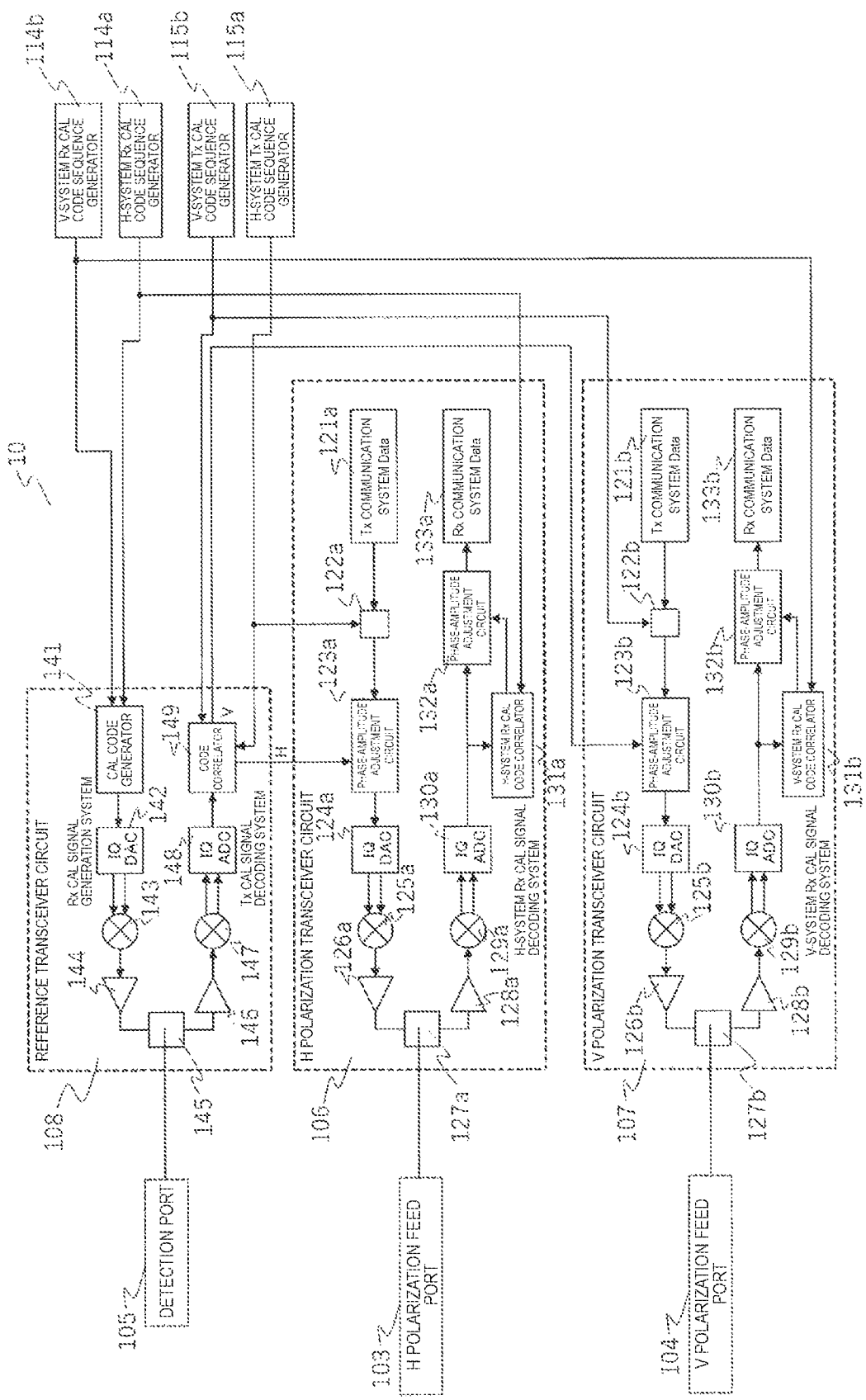
FIG. 2 is another block diagram illustrating an example of the antenna wireless device according to the first exemplary embodiment of the present disclosure.

With reference to FIGS. 1 and 2, a description will be given of antenna wireless device 10 according to a first exemplary embodiment of the present disclosure. Antenna wireless device 10 includes a phased array antenna that can perform beamforming.

FIG. 1 is a block diagram illustrating an example of antenna wireless device 10 according to the first exemplary embodiment.

Antenna wireless device 10 includes antenna substrate 101, horizontal (hereinafter referred to as "H") polarization transceiver circuit 106, vertical (hereinafter referred to as "V") polarization transceiver circuit 107, and reference transceiver circuit 108.

Antenna substrate 101 includes a plurality of patch antenna elements 102($m$, $n$) disposed on antenna substrate 101, a plurality of H polarization feed ports 103($m$, $n$) for H polarization signals, a plurality of V polarization feed ports 104($m$, $n$) for V polarization signals, and a plurality of detection ports 105($m$, $n$). Here, m denotes an integer equal to or greater than 1 and equal to or smaller than M, and n denotes an integer equal to or greater than 1 and equal to or smaller than N.

Note that, the plurality of patch antenna elements 102($m$, $n$) may also be referred to as patch antenna element(s) 102 when reference is made to all or a representative one of them. Similarly, H polarization feed ports 103($m$, $n$), V polarization feed ports 104($m$, $n$), and detection ports 105($m$, $n$) may also be referred to as H polarization feed port(s) 103, V polarization feed port(s) 104, and detection port(s) 105, respectively, when reference is made to all or a representative one of them in the respective cases.

Patch antenna elements 102($m$, $n$) are each, for example, a rectangular planar antenna element, a feeding of which is implemented by electromagnetic coupling. As an example, patch antenna elements 102($m$, $n$) are arrayed in a rectangular grid form such that patch antenna elements 102($m$, $n$) are arranged in an X-axis direction and a Y-axis direction, thus forming an M×N planar antenna array. That is, M patch antenna elements 102(1, n) to 102(M, n) arrayed in the X-axis direction constitute a patch antenna row, and N patch antenna elements 102($m$, 1) to 102($m$, N) arrayed in the Y-axis direction constitute a patch antenna column. The plurality of patch antenna elements 102 are arrayed at an interval of $\lambda/2$ or substantially $\lambda/2$ where $\lambda$ denotes a wavelength of, for example, an RF signal.

Each of detection ports 105($m$, $n$) is disposed in a center or substantially in a center of a corresponding one of patch antenna elements 102($m$, $n$). Detection ports 105(1, n) to 105(M, n) respectively disposed in the centers or substantially in the centers of patch antenna elements 102(1, n) to 102(M, n) constituting the patch antenna row are collinearly or substantially collinearly disposed at the same interval or substantially the same interval in the X-axis direction. Similarly, detection ports 105($m$, 1) to 105($m$, N) respectively disposed in the centers or substantially in the centers of patch antenna elements 102($m$, 1) to 102($m$, N) constituting the patch antenna column are collinearly or substantially collinearly disposed at the same interval or substantially the same interval in the Y-axis direction.

Each of H polarization feed ports 103($m$, $n$) is disposed in a corresponding one of patch antenna elements 102($m$, $n$) with H polarization feed port 103 being in a position spaced a predetermined distance from the center or substantially the center of patch antenna element 102 toward a positive side in the X-axis direction. Alternatively, each of H polarization feed ports 103($m$, $n$) may be disposed in a corresponding one of patch antenna elements 102($m$, $n$) with H polarization feed port 103 being in a position spaced a predetermined distance from the center or substantially the center of patch antenna element 102 toward a negative side in the X-axis direction. H polarization feed ports 103(1, n) to 103(M, n) respectively disposed in patch antenna elements 102(1, n) to 102(M, n) constituting the patch antenna row are collinearly or substantially collinearly disposed at the same interval or substantially the same interval in the X-axis direction. Thus, H polarization feed ports 103(1, n) to 103(M, n) and detection ports 105(1, n) to 105(M, n) are collinearly or substantially collinearly disposed in the X-axis direction.

Each of V polarization feed ports 104($m$, $n$) is disposed in a corresponding one of patch antenna elements 102($m$, $n$) with V polarization feed port 104 being in a position spaced a predetermined distance from the center or substantially the center of patch antenna element 102 toward a negative side in the Y-axis direction. Alternatively, each of V polarization feed ports 104($m$, $n$) may be disposed in a corresponding one of patch antenna elements 102($m$, $n$) with V polarization feed port 104 being in a position spaced a predetermined distance from the center or substantially the center of patch antenna element 102 toward a positive side in the Y-axis direction. V polarization feed ports 104($m$, 1) to 104($m$, N) respectively disposed in patch antenna elements 102($m$, 1) to 102($m$, N) constituting the patch antenna column are collinearly or substantially collinearly disposed at the same interval or substantially the same interval in the Y-axis direction. Thus, V polarization feed ports 104($m$, 1) to 104($m$, N) and detection ports 105($m$, 1) to 105($m$, N) are collinearly or substantially collinearly disposed in the Y-axis direction.

H polarization transceiver circuit 106 is a circuit for transmission and reception of H polarization signals. One H polarization transceiver circuit 106 is connected to a corresponding one of the plurality of H polarization feed ports 103. That is, M×N H polarization transceiver circuits 106 are provided.

V polarization transceiver circuit 107 is a circuit for transmission and reception of V polarization signals. One V polarization transceiver circuit 107 is connected to a corresponding one of the plurality of V polarization feed ports 104. That is, M×N V polarization transceiver circuits 107 are provided.

In a transmission system, in order for H polarization transceiver circuit 106 and V polarization transceiver circuit 107 to adjust amplitudes and phases of their transmission signals, reference transceiver circuit 108 detects, for each patch antenna element 102, power and delay time of each of an H-system code sequence for calibration and a V-system code sequence for calibration, which will be described later, and detects and acquires an amplitude and phase deviation from a predetermined value for each patch antenna element 102.

In a reception system, in order for H polarization transceiver circuit 106 and V polarization transceiver circuit 107 to adjust amplitudes and phases of their reception signals, reference transceiver circuit 108 outputs, for each patch antenna element 102, an H-system code sequence for calibration and a V-system code sequence for calibration, which will be described later, to H polarization transceiver circuit 106 and V polarization transceiver circuit 107, respectively.

In the first exemplary embodiment, one reference transceiver circuit 108 is connected to a corresponding one of the plurality of detection ports 105. That is, M×N reference transceiver circuits 108 are provided.

H polarization transceiver circuit 106, V polarization transceiver circuit 107, and reference transceiver circuit 108 may be disposed on a back side of a surface of the planar antenna array (below the surface of the planar antenna array in a Z-axis direction).

FIG. 2 is another block diagram illustrating an example of antenna wireless device 10 according to the first exemplary embodiment.

FIG. 2 also illustrates an example of internal configurations of H polarization transceiver circuit 106, V polarization transceiver circuit 107, and reference transceiver circuit 108.

As illustrated in FIG. 2, antenna wireless device 10 further includes H-system Rx calibration (CAL) code sequence generator 114a, V-system Rx CAL code sequence generator 114b, H-system Tx CAL code sequence generator 115a, and V-system Tx CAL code sequence generator 115b. Note that, a CAL code sequence may also be referred to as a correlation code sequence.

H-system Rx CAL code sequence generator 114a generates a CAL code sequence for calibration of an H polarization reception system. The CAL code sequence is, for example, a pseudo-noise (PN) code such as M-sequences or a Gold code. Then, H-system Rx CAL code sequence generator 114a outputs the resultant CAL code sequence to CAL code generator 141 (to be described later) of reference transceiver circuit 108 and to H-system Rx CAL code correlator 131a (to be described later) of H polarization transceiver circuit 106.

V-system Rx CAL code sequence generator 114b generates a CAL code sequence for calibration of a V polarization reception system. The CAL code sequence is, for example, the PN code such as the M-sequences or the Gold code. Then, V-system Rx CAL code sequence generator 114b outputs the resultant CAL code sequence to CAL code generator 141 (to be described later) of reference transceiver circuit 108 and to V-system Rx CAL code correlator 131b (to be described later) of V polarization transceiver circuit 107.

H-system Tx CAL code sequence generator 115a generates a CAL code sequence for calibration of an H polarization transmission system. The CAL code sequence is, for example, the PN code such as the M-sequences or the Gold code. Then, H-system Tx CAL code sequence generator 115a outputs the resultant CAL code sequence to code correlator 149 (to be described later) of reference transceiver circuit 108 and to phase-amplitude adjustment circuit 123a (to be described later) through switch 122a (to be described later) of H polarization transceiver circuit 106.

V-system Tx CAL code sequence generator 115b generates a CAL code sequence for calibration of a V polarization transmission system. The CAL code sequence is, for example, the PN code such as the M-sequences or the Gold code. Then, V-system Tx CAL code sequence generator 115b outputs the resultant CAL code sequence to code correlator 149 (to be described later) of reference transceiver circuit 108 and to phase-amplitude adjustment circuit 123b (to be described later) through switch 122b (to be described later) of V polarization transceiver circuit 107.

H polarization transceiver circuit 106 includes switch 122a, phase-amplitude adjustment circuit 123a, IQ digital to analog converter (DAC) 124a, frequency converter 125a, power amplifier 126a, input-output coupler 127a, low noise amplifier (LNA) 128a, quadrature demodulator 129a, IQ analog to digital converter (ADC) 130a, H-system Rx CAL code correlator 131a, and phase-amplitude adjustment circuit 132a.

When the calibration of the H polarization transmission system is performed, switch 122a outputs the CAL code sequence (first signal) generated by H-system Tx CAL code sequence generator 115a to phase-amplitude adjustment circuit 123a. Additionally, when the H polarization signal is transmitted, switch 122a outputs transmission signal 121a to phase-amplitude adjustment circuit 123a. For example, transmission signal 121a is received from an external device.

When the calibration of the H polarization transmission system is performed, phase-amplitude adjustment circuit 123a outputs, to IQ DAC 124a, the CAL code sequence received from switch 122a. Additionally, when the H polarization signal is transmitted, phase-amplitude adjustment circuit 123a adjusts, using correlation data (amplitude and phase deviation of an H polarization system) which will be described later, transmission power and a transmission phase of the transmission signal received from switch 122a. The correlation data is data that is detected by code correlator 149 of reference transceiver circuit 108 and then input to phase-amplitude adjustment circuit 123a. Then, phase-amplitude adjustment circuit 123a outputs the resultant transmission signal to IQ DAC 124a.

A description will be given of respective operations of IQ DAC 124a, frequency converter 125a, and power amplifier 126a in the case where the calibration of the H polarization transmission system is performed.

IQ DAC 124a subjects the CAL code sequence, which has been received from phase-amplitude adjustment circuit 123a, to digital to analog (DA) conversion, followed by quadrature modulation, and outputs an analog signal derived from the CAL code sequence to frequency converter 125a.

Frequency converter 125a subjects the analog signal, which has been received from IQ DAC 124a, derived from the CAL code sequence to frequency conversion (up-conversion) to convert the analog signal into a transmission calibration signal (second signal), and outputs the transmission calibration signal to power amplifier 126a.

Power amplifier 126a amplifies a level of the transmission calibration signal to a desired transmission level and feeds, through input-output coupler 127a, the transmission calibration signal to corresponding H polarization feed port 103 of H polarization feed ports 103(m, n). The transmission calibration signal fed to H polarization feed port 103 is output to corresponding detection port 105 through patch antenna element 102 associated with the H polarization feed port 103.

LNA 128a amplifies a level of a reception calibration signal (in the case of performing the calibration of the H polarization reception system) which is a desired CAL code sequence or a level of a reception signal (in a case of decoding the H polarization signal), both having been received from H polarization feed port 103 through input-output coupler 127a, and outputs the resultant signal to quadrature demodulator 129a.

Quadrature demodulator 129a subjects the reception calibration signal or the reception signal, which has been received from LNA 128a, to frequency conversion (down-conversion), and outputs the resultant signal to IQ ADC 130a.

IQ ADC 130a subjects the signal, which has been received from quadrature demodulator 129a, to analog to digital (AD) conversion to convert the signal into a digital data signal (digital data signal in the case of performing the calibration of the H polarization reception system: sixth signal), and outputs the digital data signal to H-system Rx CAL code correlator 131*a* and phase-amplitude adjustment circuit 132*a*.

When the calibration of the H polarization reception system is performed, H-system Rx CAL code correlator 131*a* takes a code correlation to thereby detect a correlation between the digital data signal received from IQ ADC 130*a* and the CAL code sequence (H-system code sequence) generated by and received from H-system Rx CAL code sequence generator 114*a*. As a result, H-system Rx CAL code correlator 131*a* detects power and delay time of the CAL code sequence (H-system code sequence) and detects an amplitude and phase deviation from a predetermined value. Then, H-system Rx CAL code correlator 131*a* outputs the amplitude and phase deviation, which is correlation data, to phase-amplitude adjustment circuit 132*a*.

When the H polarization signal is decoded, phase-amplitude adjustment circuit 132*a* adjusts power and a phase of the digital data signal, which has been received from IQ ADC 130*a*, derived from the reception signal, using the amplitude and phase deviation received from H-system Rx CAL code correlator 131*a*. As a result, phase-amplitude adjustment circuit 132*a* decodes reception signal 133*a* and outputs the resultant reception signal to, for example, an external device.

V polarization transceiver circuit 107 includes switch 122*b*, phase-amplitude adjustment circuit 123*b*, IQ DAC 124*b*, frequency converter 125*b*, power amplifier 126*b*, input-output coupler 127*b*, LNA 128*b*, quadrature demodulator 129*b*, IQ ADC 130*b*, V-system Rx CAL code correlator 131*b*, and phase-amplitude adjustment circuit 132*b*.

When the calibration of the V polarization transmission system is performed, switch 122*b* outputs the CAL code sequence (first signal) generated by V-system Tx CAL code sequence generator 115*b* to phase-amplitude adjustment circuit 123*b*. Additionally, when the V polarization signal is transmitted, switch 122*b* outputs transmission signal 121*b* to phase-amplitude adjustment circuit 123*b*. For example, transmission signal 121*b* is received from an external device.

When the calibration of the V polarization transmission system is performed, phase-amplitude adjustment circuit 123*b* outputs, to IQ DAC 124*b*, the CAL code sequence received from switch 122*b*. Additionally, when the V polarization signal is transmitted, phase-amplitude adjustment circuit 123*b* adjusts, using correlation data (amplitude and phase deviation of a V polarization system) which will be described later, transmission power and a transmission phase of the transmission signal received from switch 122*b*. The correlation data is data that is detected by code correlator 149 of reference transceiver circuit 108 and then input to phase-amplitude adjustment circuit 123*b*. Then, phase-amplitude adjustment circuit 123*b* outputs the resultant transmission signal to IQ DAC 124*b*.

A description will be given of respective operations of IQ DAC 124*b*, frequency converter 125*b*, and power amplifier 126*b* in the case where the calibration of the V polarization transmission system is performed.

IQ DAC 124*b* subjects the CAL code sequence, which has been received from phase-amplitude adjustment circuit 123*b*, to DA conversion, followed by quadrature modulation, and outputs an analog signal derived from the CAL code sequence to frequency converter 125*b*.

Frequency converter 125*b* subjects the analog signal, which has been received from IQ DAC 124*b*, derived from the CAL code sequence to frequency conversion (up-conversion) to convert the analog signal into a transmission calibration signal (second signal), and outputs the transmission calibration signal to power amplifier 126*b*.

Power amplifier 126*b* amplifies a level of the transmission calibration signal to a desired transmission level and feeds, through input-output coupler 127*b*, the transmission calibration signal to corresponding V polarization feed port 104 of V polarization feed ports 104(*m, n*). The transmission calibration signal fed to V polarization feed port 104 is output to corresponding detection port 105 through patch antenna element 102 associated with V polarization feed port 104.

LNA 128*b* amplifies a level of a reception calibration signal (in the case of performing the calibration of the V polarization reception system) which is a desired CAL code sequence or a level of a reception signal (in a case of decoding the V polarization signal), both having been received from V polarization feed port 104 through input-output coupler 127*b*, and outputs the resultant signal to quadrature demodulator 129*b*.

Quadrature demodulator 129*b* subjects the reception calibration signal or the reception signal, which has been received from LNA 128*b*, to frequency conversion (down-conversion), and outputs the resultant signal to IQ ADC 130*b*.

IQ ADC 130*b* subjects the signal, which has been received from quadrature demodulator 129*b*, to AD conversion to convert the signal into a digital data signal (digital data signal in the case of performing the calibration of the V polarization reception system: sixth signal), and outputs the digital data signal to V-system Rx CAL code correlator 131*b* and phase-amplitude adjustment circuit 132*b*.

When the calibration of the V polarization reception system is performed, V-system Rx CAL code correlator 131*b* takes a code correlation to thereby detect a correlation between the digital data signal received from IQ ADC 130*b* and the CAL code sequence (V-system code sequence) generated by and received from V-system Rx CAL code sequence generator 114*b*. As a result, V-system Rx CAL code correlator 131*b* detects power and delay time of the CAL code sequence (V-system code sequence) and detects an amplitude and phase deviation from a predetermined value. Then, V-system Rx CAL code correlator 131*b* outputs the amplitude and phase deviation, which is correlation data, to phase-amplitude adjustment circuit 132*b*.

When the V polarization signal is decoded, phase-amplitude adjustment circuit 132*b* adjusts power and a phase of the digital data signal, which has been received from IQ ADC 130*b*, derived from the reception signal, using the amplitude and phase deviation received from V-system Rx CAL code correlator 131*b*. As a result, phase-amplitude adjustment circuit 132*b* decodes reception signal 133*b* and outputs the resultant reception signal to, for example, an external device.

Reference transceiver circuit 108 includes CAL code generator 141, IQ DAC 142, frequency converter 143, power amplifier 144, transceiver duplexer or switch 145, LNA 146, quadrature demodulator 147, IQ ADC 148, and code correlator 149.

CAL code generator 141 combines the CAL code sequence generated by H-system Rx CAL code sequence generator 114*a* and the CAL code sequence generated by and received from V-system Rx CAL code sequence generator 114*b* to generate a combined signal (fourth signal). Then, CAL code generator 141 outputs the combined signal to the IQ DAC 142.

IQ DAC 142 subjects the combined signal (digital signal), which has been received from CAL code generator 141, to DA conversion, followed by quadrature modulation, and outputs an analog signal derived from the combined signal to frequency converter 143.

Frequency converter 143 subjects the analog signal, which has been received from IQ DAC 142, derived from the combined signal to frequency conversion (up-conversion) to convert the analog signal into a reception calibration signal (fifth signal), and outputs the reception calibration signal to power amplifier 144.

Power amplifier 144 amplifies a level of the reception calibration signal to a desired transmission level and feeds, through transceiver duplexer or switch 145, the reception calibration signal to detection port 105 associated with corresponding patch antenna element 102 of patch antenna elements 102(*m, n*).

The reception calibration signal fed to detection port 105 is output to corresponding H polarization feed port 103 and corresponding V polarization feed port 104 through patch antenna element 102 associated with detection port 105.

The transmission calibration signal fed to H polarization feed port 103 and the transmission calibration signal fed to V polarization feed port 104 are output to corresponding detection port 105 of the plurality of detection ports 105 as a combined signal (second signal: hereinafter referred to as a detection signal) of an H-system signal and a V-system signal that are detected by code correlator 149.

LNA 146 amplifies a level of a desired detection signal received from corresponding detection port 105 of the plurality of detection ports 105 through transceiver duplexer or switch 145, and outputs the resultant signal to quadrature demodulator 147.

Quadrature demodulator 147 subjects the detection signal, which has been received from LNA 146, to frequency conversion (down-conversion), and outputs the resultant signal to IQ ADC 148.

IQ ADC 148 subjects the signal, which has been received from quadrature demodulator 147, to AD conversion to convert the signal into a digital data signal (third signal), and outputs the digital data signal to code correlator 149.

Code correlator 149 separates the digital data signal into an H polarization component and a V polarization component. Then, code correlator 149 takes a code correlation to thereby detect a correlation between the digital data signal received from IQ ADC 148 and the CAL code sequence generated by and received from H-system Tx CAL code sequence generator 115*a*. Similarly, code correlator 149 takes a code correlation to thereby detect a correlation between the digital data signal received from IQ ADC 148 and the CAL code sequence generated by and received from V-system Tx CAL code sequence generator 115*b*. As a result, code correlator 149 detects power and delay time of each of the H polarization component and the V polarization component and detects an amplitude and phase deviation which is correlation data. Then, code correlator 149 outputs the detected correlation data of the H polarization component to (transmission system) phase-amplitude adjustment circuit 123*a* of H polarization transceiver circuit 106, and outputs the detected correlation data of the V polarization component to (transmission system) phase-amplitude adjustment circuit 123*b* of V polarization transceiver circuit 107.

Here, in the example of FIG. 2, input-output couplers 127*a* and 127*b* are shared devices such as duplexers in a case of using an FDD scheme as an access scheme for the antenna wireless device, and are switches in a case of using a TDD scheme as the access scheme for the antenna wireless device.

With reference to FIGS. 3A to 5, a description will now be given of an example of the configuration of the antenna substrate of the antenna wireless device according to the first exemplary embodiment.

Figure 3A:
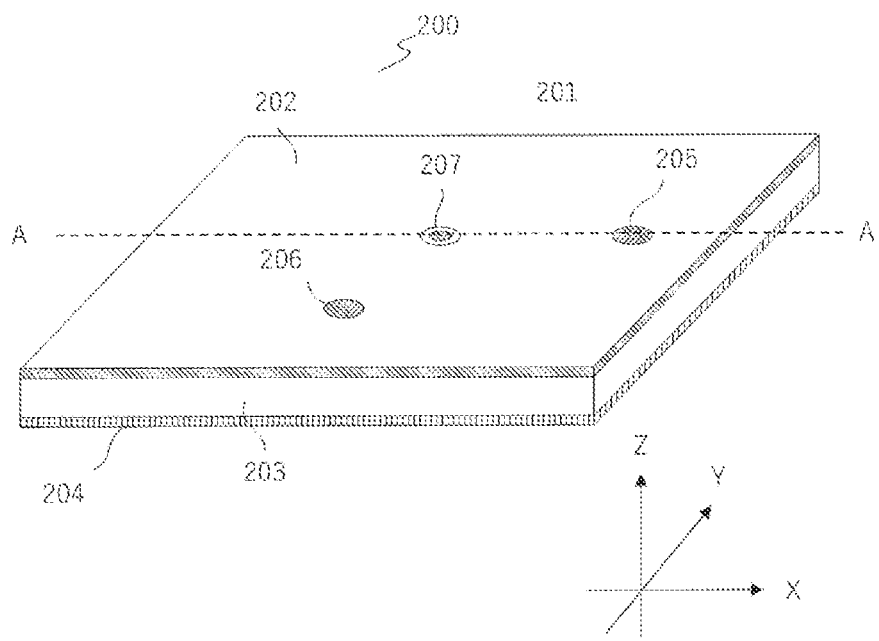
FIG. 3A is a perspective view illustrating an example of a configuration of an antenna substrate of the antenna wireless device according to the first exemplary embodiment of the present disclosure.

FIG. 3A is a perspective view illustrating an example of a configuration of antenna substrate 201 of the antenna wireless device according to the first exemplary embodiment.

Here, antenna substrate 201, patch antenna element 200, H polarization feed port 205, V polarization feed port 206, and detection port 207, which are illustrated in FIG. 3A, respectively correspond to antenna substrate 101, patch antenna element 102, H polarization feed port 103, V polarization feed port 104, and detection port 105, which are illustrated in FIG. 1.

Antenna substrate 201 is a multilayer substrate including antenna pattern 202, dielectric 203, and ground (GND) pattern 204. H polarization feed port 205, V polarization feed port 206, and detection port 207 are connected to antenna pattern 202.

H polarization feed port 205 is disposed in patch antenna element 200 with H polarization feed port 205 being in a position spaced a predetermined distance from a center or substantially a center of patch antenna element 200 toward the positive side in the X-axis direction.

V polarization feed port 206 is disposed in patch antenna element 200 with V polarization feed port 206 being in a position spaced a predetermined distance from the center or substantially the center of patch antenna element 200 toward the negative side in the Y-axis direction.

Detection port 207 is disposed in the center or substantially in the center of patch antenna element 200.

Figure 3B:
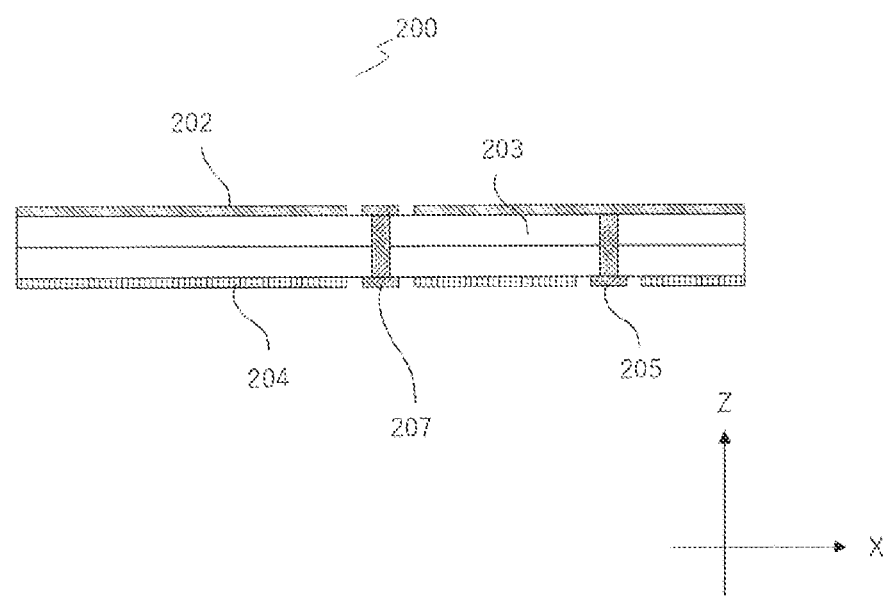
FIG. 3B is a cross-sectional view taken along line A-A in FIG. 3A.

FIG. 3B is a cross-sectional view taken along line A-A in FIG. 3A.

As illustrated in FIG. 3B, detection port 207 includes a through via hole between antenna pattern 202 on a top surface of antenna substrate 201 and a GND plane on a bottom surface of antenna substrate 201. Then, a gap is provided between detection port 207 and antenna pattern 202. The gap thus provided separates detection port 207 from antenna pattern 202. Thus, a coupling amount can be controlled and an attenuation amount can be secured. As an example, such a gap is desirably approximately 5% of an effective electrical length based on a relative permittivity of dielectric 203. In this case, the attenuation amount is approximately 20 dB.

Note that, an excessively wide gap (for example, 10% of the effective electrical length based on the relative permittivity of dielectric 203) results in a large area reduction of antenna pattern 202 with respect to detection port 207. Thus, the excessively wide gap is undesirable since an influence on an operation of patch antenna element 200 increases.

H polarization feed port 205 includes a via hole between antenna pattern 202 on the top surface of antenna substrate 201 and the GND plane on the bottom surface of antenna substrate 201, and is directly connected to antenna pattern 202.

Although not illustrated, similarly, V polarization feed port 206 includes a via hole between antenna pattern 202 on the top surface of antenna substrate 201 and the GND plane on the bottom surface of antenna substrate 201, and is directly connected to antenna pattern 202.

Figure 4:
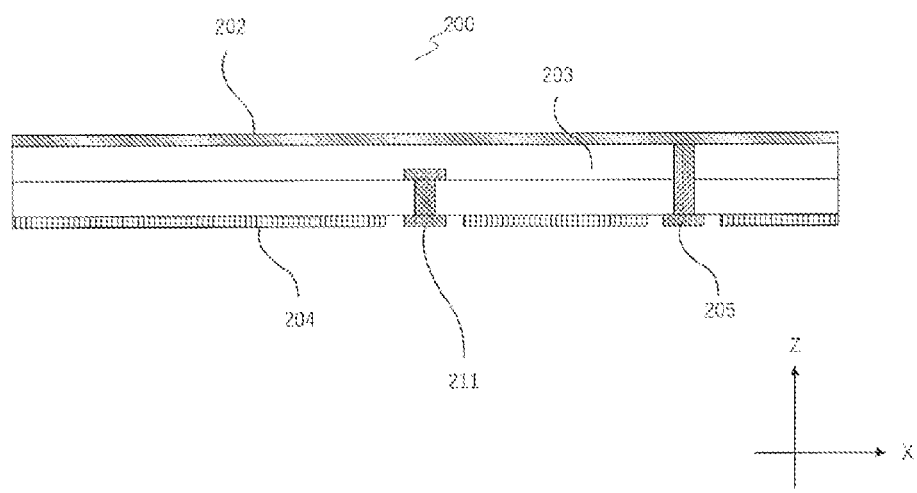
FIG. 4 is a cross-sectional view illustrating another example of the configuration of the antenna substrate of the antenna wireless device according to the first exemplary embodiment of the present disclosure.

FIG. 4 is a cross-sectional view illustrating another example of the configuration of the antenna substrate of the antenna wireless device according to the first exemplary embodiment.

In the example of FIG. 4, detection port 211 is used instead of detection port 207 of FIGS. 3A and 3B.

Detection port 211 includes an inner via hole (IVH) from the GND plane to an intermediate layer of dielectric 203, and is separated from antenna pattern 202 with dielectric 203 interposed between detection port 211 and antenna pattern 202.

Figure 5:
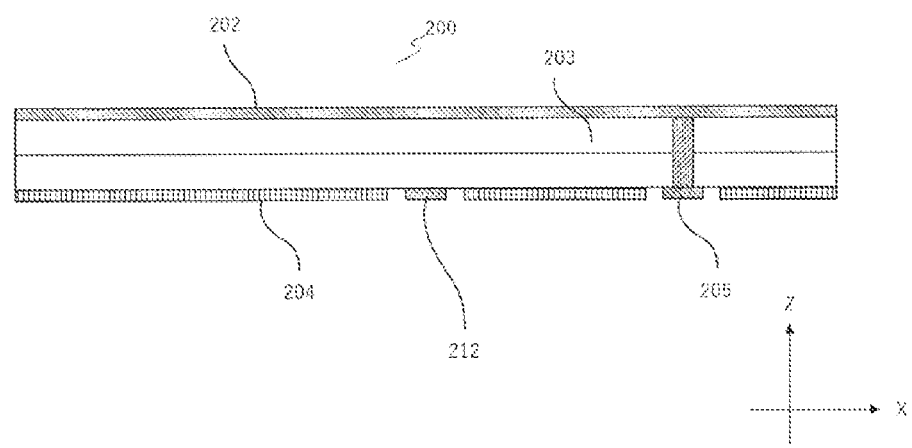
FIG. 5 is a cross-sectional view illustrating yet another example of the configuration of the antenna substrate of the antenna wireless device according to the first exemplary embodiment of the present disclosure.

FIG. 5 is a cross-sectional view illustrating yet another example of the configuration of the antenna substrate of the antenna wireless device according to the first exemplary embodiment.

In the example of FIG. 5, detection port 212 is used instead of detection port 207 of FIGS. 3A and 3B.

Detection port 212 is disposed in the GND plane and is separated from antenna pattern 202 with dielectric 203 interposed between detection port 212 and dielectric 203.

<Calibration Operation of Antenna Wireless Device>

With reference to FIGS. 1 and 2, a description will now be given of a calibration operation of the transmission system according to the first exemplary embodiment.

The CAL code sequence generated by H-system Tx CAL code sequence generator 115a is passed through switch 122a and phase-amplitude adjustment circuit 123a, then subjected to quadrature modulation by IQ DAC 124a, and then converted into a transmission calibration signal by frequency converter 125a.

The transmission calibration signal is passed through power amplifier 126a and input-output coupler 127a, and then fed to H polarization feed port 103.

Similarly, the CAL code sequence generated by V-system Tx CAL code sequence generator 115b is passed through switch 122b and phase-amplitude adjustment circuit 123b, then subjected to quadrature modulation by IQ DAC 124b, and then converted into a transmission calibration signal by frequency converter 125b.

The transmission calibration signal is passed through power amplifier 126b and input-output coupler 127b, and then fed to V polarization feed port 104.

Regarding the CAL code sequence used for calibration, different correlation code sequences are used for the H system and the V system. These CAL code sequences are desirably orthogonal sequences.

The transmission calibration signal fed to the H polarization feed port and the transmission calibration signal fed to the V polarization feed port are output to detection port 105 as the detection signal.

Here, since detection port 105 is disposed in the center or substantially in the center of patch antenna element 102, the detection signal fed to detection port 105 has a smaller excitation current as compared with the respective signals passed through H polarization feed port 103 and V polarization feed port 104. Additionally, since detection port 105 is not directly connected to the antenna pattern of patch antenna element 102 as described above, the detection signal fed to detection port 105 is detected as a signal having power considerably smaller than transmission power. Thus, in view of these facts, an influence on radiation characteristics of the antenna is reduced.

Next, the detection signal fed to detection port 105 is output to reference transceiver circuit 108, received and subjected to frequency conversion by transceiver duplexer or switch 145, LNA 146, quadrature demodulator 147 and a Tx CAL signal decoding system, and then converted into a digital data signal through AD conversion by IQ ADC 148.

Code correlator 149 separates the digital data signal into an H polarization component and a V polarization component. Then, code correlator 149 detects a correlation between the digital data signal and the CAL code sequence generated by H-system Tx CAL code sequence generator 115a. Similarly, code correlator 149 detects a correlation between the digital data signal and the CAL code sequence generated by V-system Tx CAL code sequence generator 115b. As a result, code correlator 149 detects power and delay time of each of the H polarization component and the V polarization component and detects an amplitude and phase deviation.

The amplitude and phase deviation of the H polarization component detected by code correlator 149 is output to phase-amplitude adjustment circuit 123a of H polarization transceiver circuit 106. Similarly, the amplitude and phase deviation of the V polarization component detected by code correlator 149 is output to phase-amplitude adjustment circuit 123b of V polarization transceiver circuit 107.

Phase-amplitude adjustment circuit 123a can adjust the transmission power and a transmission phase of transmission signal 121a to predetermined values, using the amplitude and phase deviation of the H polarization component. Phase-amplitude adjustment circuit 123b can adjust the transmission power and a transmission phase of transmission signal 121b to predetermined values, using the amplitude and phase deviation of the V polarization component.

For each of the plurality of patch antenna elements 102(1, 1) to 102(M, N), H polarization transceiver circuit 106, V polarization transceiver circuit 107, and reference transceiver circuit 108 can perform operations similar to those described above. Consequently, by detecting power and delay time of each of the H polarization transmission system and the V polarization transmission system for each patch antenna element 102 and by detecting and acquiring an amplitude and phase deviation for each patch antenna element 102, a deviation can be corrected for each patch antenna element 102, and transmission beamforming accuracy can be improved.

Furthermore, even if transmission power fluctuations caused by temperature fluctuations or the like occur between patch antenna element 102 and each of H polarization transceiver circuit 106 (H-system Rx CAL code correlator 131a), V polarization transceiver circuit 107 (V-system Rx CAL code correlator 131b), and reference transceiver circuit 108 (code correlator 149), the transmission power of the transmission signal can be corrected to appropriate power.

With reference to FIGS. 1 and 2, a description will now be given of a calibration operation of the reception system according to the first exemplary embodiment.

In an Rx CAL signal generation system, CAL code generator 141 combines the CAL code sequence generated by H-system Rx CAL code sequence generator 114a and the CAL code sequence generated by V-system Rx CAL code sequence generator 114b to generate a combined signal.

The combined signal is subjected, by the IQ DAC 142, to DA conversion, followed by quadrature modulation, and converted into a reception calibration signal by frequency converter 143.

The reception calibration signal is fed to detection port 105 associated with patch antenna element 102.

The reception calibration signal fed to detection port 105 is output to H polarization feed port 103 and V polarization feed port 104 through patch antenna element 102.

Similarly to the operation of the transmission system, since detection port 105 is disposed in the center or substantially in the center of patch antenna element 102, the reception calibration signal fed to detection port 105 has a smaller excitation current as compared with respective signals passed through H polarization feed port 103 and V polarization feed port 104. Additionally, since detection port 105 is not directly connected to the antenna pattern of patch antenna element 102 as described above, the reception calibration signal fed to detection port 105 is output to H polarization feed port 103 and V polarization feed port 104 as a signal attenuated with respect to reception calibration power.

Next, the reception calibration signal output to H polarization feed port 103 is received by an H-system Rx CAL signal decoding system through LNA 128a of H polarization transceiver circuit 106, subjected to frequency conversion by quadrature demodulator 129a, and then converted into a digital data signal through AD conversion by IQ ADC 130a.

H-system Rx CAL code correlator 131a detects a correlation between the digital data signal and an H-system CAL code sequence, thereby detecting power and delay time of the H polarization component and detecting an amplitude and phase deviation.

Similarly, the reception calibration signal output to V polarization feed port 104 is received by a V-system Rx CAL signal decoding system through LNA 128b of V polarization transceiver circuit 107, subjected to frequency conversion by quadrature demodulator 129b, and then converted into a digital data signal through AD conversion by IQ ADC 130b.

V-system Rx CAL code correlator 131b detects a correlation between the digital data signal and a V-system CAL code sequence, thereby detecting power and delay time of the V polarization component, and detecting an amplitude and phase deviation.

For each of the plurality of patch antenna elements 102(1, 1) to 102(M, N), H polarization transceiver circuit 106, V polarization transceiver circuit 107, and reference transceiver circuit 108 can perform operations similar to those described above. Consequently, by detecting power and delay time of each of the H polarization reception system and the V polarization reception system for each patch antenna element 102 and by detecting and acquiring an amplitude and phase deviation for each patch antenna element 102, a deviation can be corrected for each patch antenna element 102, and reception beamforming accuracy can be improved.

Furthermore, using one detection port enables detection of the power and delay time (and thus the amplitude and phase deviation) of each of the H polarization system and the V polarization system. This allows a phased array to be made smaller in size.

As described above, with the configuration according to the first exemplary embodiment, it is possible to correct a difference in path characteristics between patch antenna element 102 and each of code correlator 149 (reference transceiver circuit 108), H-system Rx CAL code correlator 131a (H polarization transceiver circuit 106), and V-system Rx CAL code correlator 131b (V polarization transceiver circuit 107), which detect the amplitude and phase deviation. That is, it is possible to correct a difference in path characteristics, which is caused by differences in temperatures and in line lengths, between patch antenna element 102 and the respective detectors of code correlator 149, H-system Rx CAL code correlator 131a, and V-system Rx CAL code correlator 131b. As a result, it is possible to correct the amplitude and phase deviation for each patch antenna element 102 in transmission and reception paths, and to improve the beamforming accuracy.

Additionally, it is possible to improve area efficiency by detecting the amplitude and phase deviation for each of the transmission and reception paths including patch antenna element 102 and by providing one detection port that is shared for a plurality of polarized waves such as H polarized waves and V polarized waves. This can provide a panel-shaped phased array antenna, for example, with transmission and reception systems being disposed on a back side of a surface of a planar array antenna.

Note that, in the example described in the first exemplary embodiment, one H polarization feed port 103 and one V polarization feed port 104 are associated with one patch antenna element 102. However, the present disclosure is not limited to this example. For example, only one V polarization feed port 104 may be associated with one patch antenna element 102 without one H polarization feed port 103, or alternatively only one H polarization feed port 103 may be associated with one patch antenna element 102 without one V polarization feed port 104.

As described above, when only one H polarization feed port 103 or only one V polarization feed port 104 is associated with one patch antenna element 102, only one CAL code sequence may be used.

Additionally, the above-described calibration of the transmission system may be performed parallelly or sequentially for the plurality of patch antenna elements 102. Similarly, the above-described calibration of the reception system may be performed parallelly or sequentially for the plurality of patch antenna elements 102.

Additionally, in the example described in the first exemplary embodiment, switches 122a and 122b are used. However, the present disclosure is not limited to this example. For example, an adder may be used instead of switches 122a and 122b. In a case of using the adder, the situation is as follows. Transmission signal 121a to which the CAL code sequence is added is passed through phase-amplitude adjustment circuit 123a, then subjected to quadrature modulation by IQ DAC 124a, and then converted into a transmission carrier frequency signal by frequency converter 125a. Transmission signal 121b to which the CAL code sequence is added is passed through phase-amplitude adjustment circuit 123b, then subjected to quadrature modulation by IQ DAC 124b, and then converted into a transmission carrier frequency signal by frequency converter 125b. Such a transmission carrier frequency signal may be used as a transmission calibration signal.

Second Exemplary Embodiment

Figure 6:
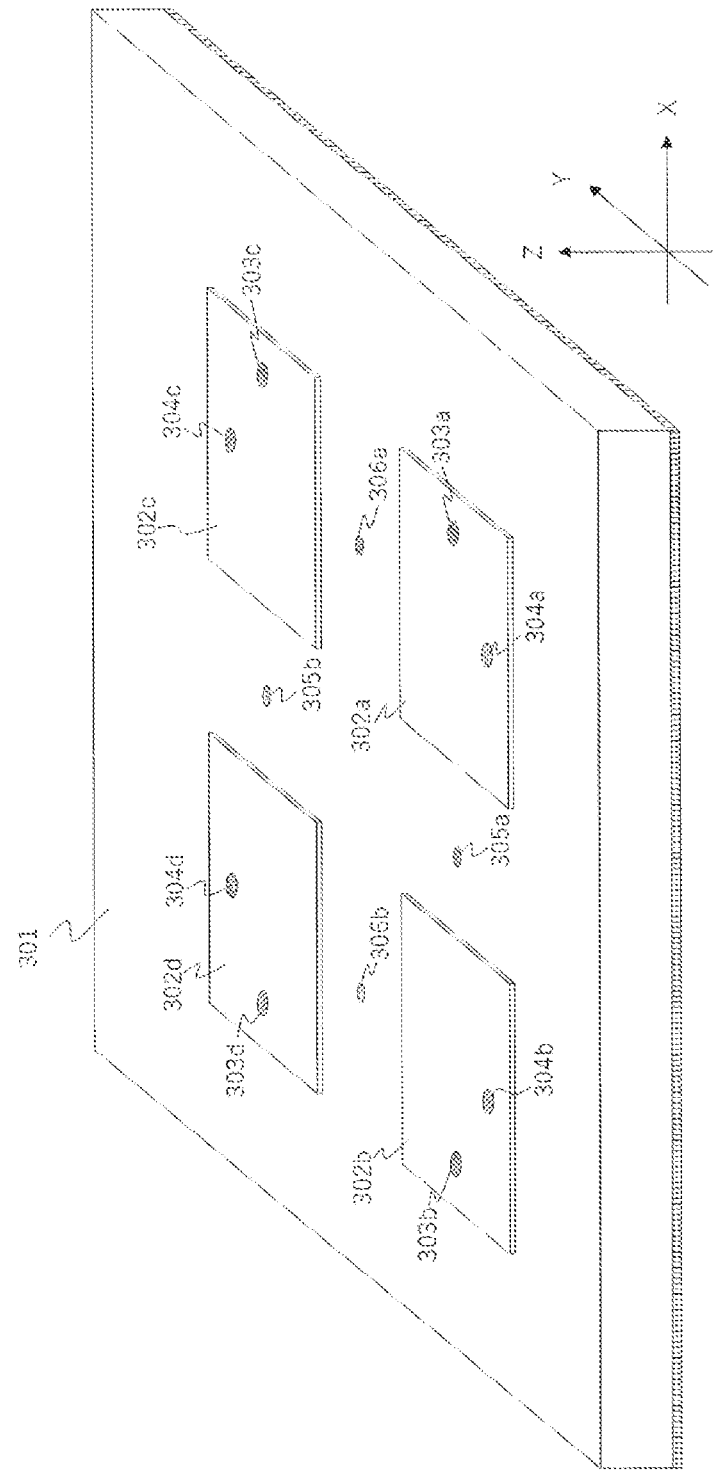
FIG. 6 is a perspective view illustrating an example of an antenna substrate of an antenna wireless device according to a second exemplary embodiment of the present disclosure.
Figure 7:
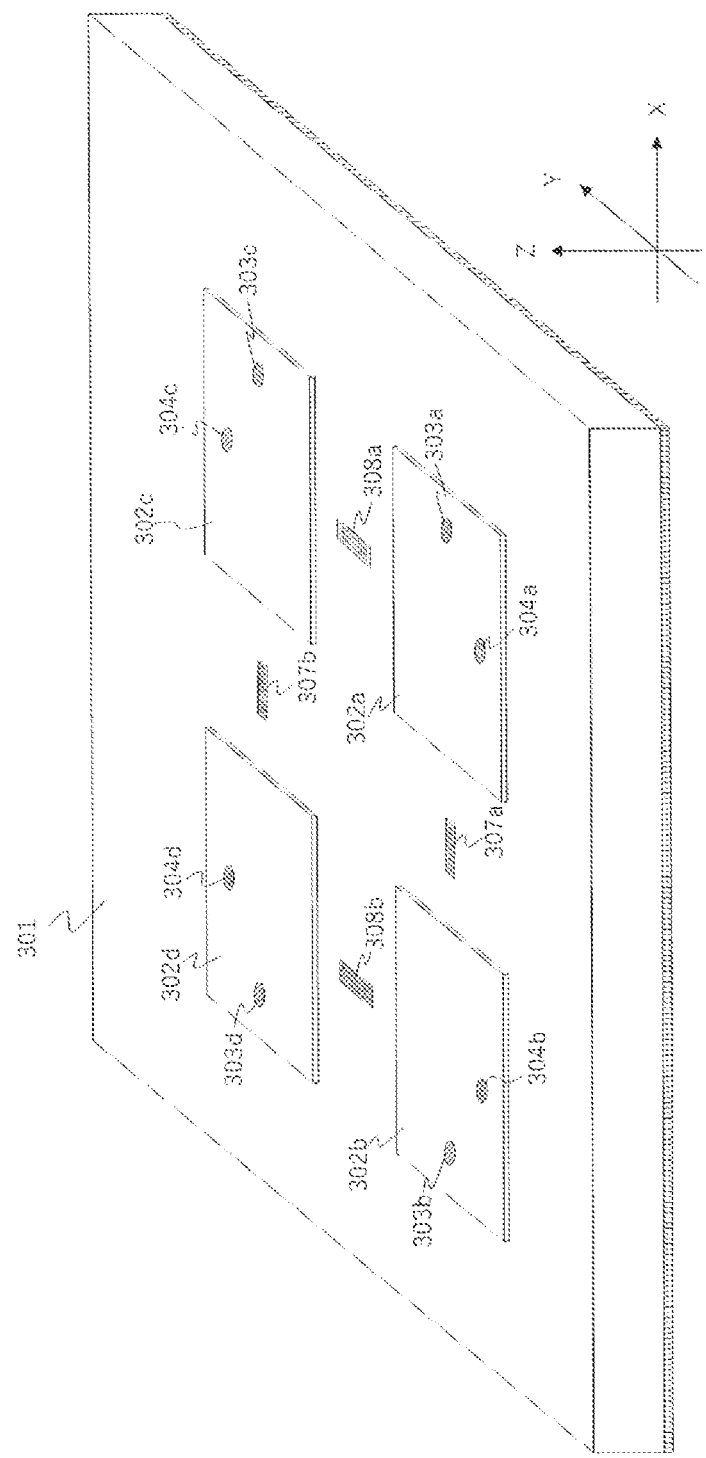
FIG. 7 is a perspective view illustrating another example of the antenna substrate of the antenna wireless device according to the second exemplary embodiment of the present disclosure.
Figure 8:
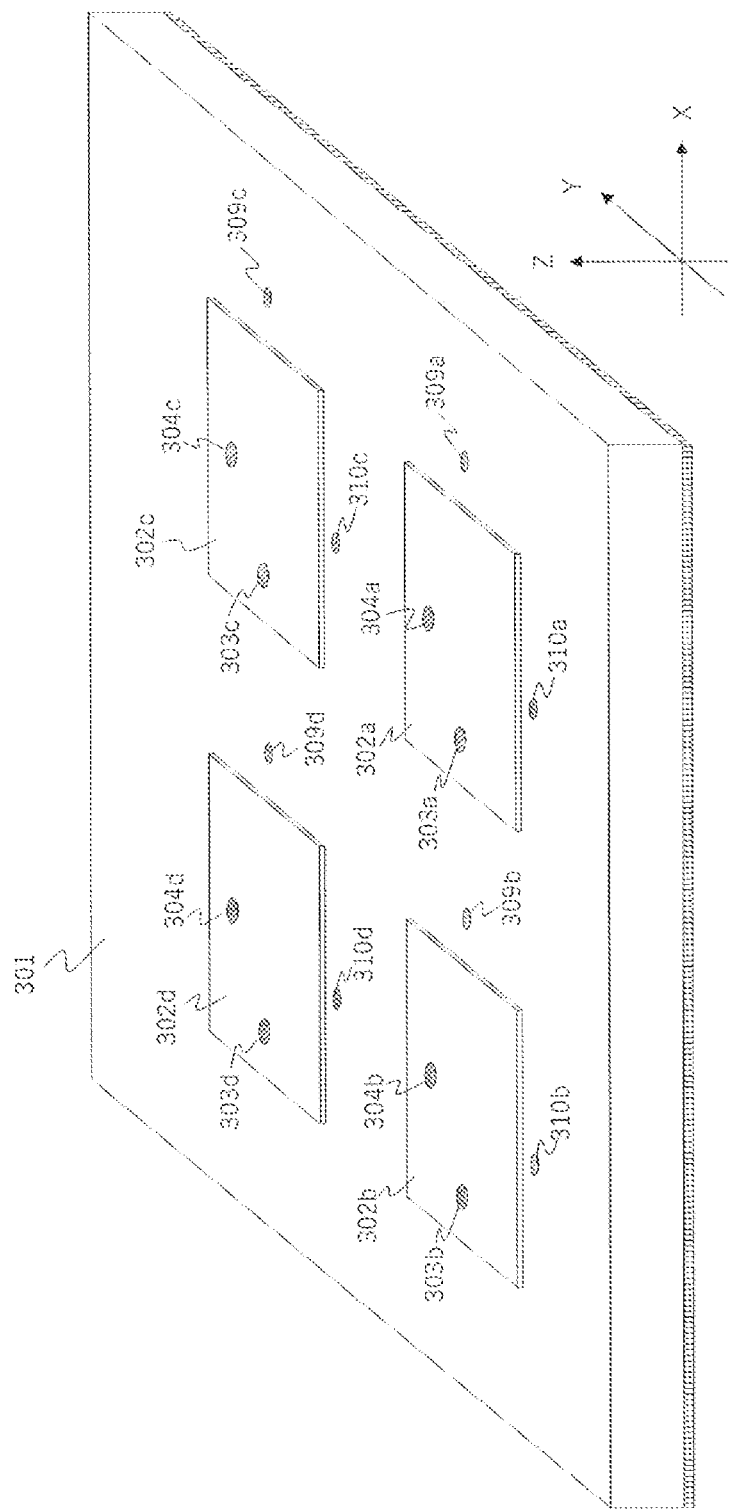
FIG. 8 is a perspective view illustrating yet another example of the antenna substrate of the antenna wireless device according to the second exemplary embodiment of the present disclosure.

With reference to FIGS. 6 to 8, a description will be given of an antenna substrate of an antenna wireless device according to a second exemplary embodiment of the present disclosure. A description for the same components as those in the antenna wireless device according to the first exemplary embodiment will be omitted.

In the second exemplary embodiment, the number of the plurality of patch antenna elements is four. That is, both M and N are 2.

First Example

FIG. 6 is a perspective view illustrating an example of antenna substrate 301 of the antenna wireless device according to the second exemplary embodiment.

In the example of FIG. 6, antenna substrate 301 includes patch antenna element 302a, patch antenna element 302b, patch antenna element 302c, and patch antenna element 302d.

Note that, the plurality of patch antenna elements 302a to 302d may also be referred to as patch antenna element(s) 302 when reference is made to all or a representative one of them.

In patch antenna element 302a, H polarization feed port 303a and V polarization feed port 304a are disposed with the same positional relationship as described in conjunction with patch antenna element 102 illustrated in FIG. 1.

Here, in patch antenna elements 302b to 302d, H polarization feed port 303 and V polarization feed port 304 are disposed in a position close to an outer side in each of patch antenna elements 302b to 302d. That is, H polarization feed ports 303 and V polarization feed ports 304 of four patch antenna elements 302 are in a positional relationship of rotation symmetry.

Note that, the plurality of H polarization feed ports 303a to 303d may also be referred to as H polarization feed port(s) 303 when reference is made to all or a representative one of them. Similarly, the plurality of V polarization feed ports 304a to 304d may also be referred to as V polarization feed port(s) 304 when reference is made to all or a representative one of them.

In the example of FIG. 6, antenna substrate 301 further includes detection port 305a, detection port 305b, detection port 306a, and detection port 306b.

Note that, the plurality of detection ports 305a and 305b and the plurality of detection ports 306a and 306b may also be referred to as detection port(s) 305 and detection port(s) 306, respectively, when reference is made to all or a representative one of them in the respective cases.

Detection port 305a is disposed in an intermediate position or a substantially intermediate position between patch antenna element 302a and patch antenna element 302b, which are adjacent to each other in the X-axis direction.

Additionally, detection port 305a, H polarization feed port 303a, and H polarization feed port 303b are collinearly or substantially collinearly disposed in the X-axis direction.

Similarly, detection port 305b is disposed in an intermediate position or a substantially intermediate position between patch antenna element 302c and patch antenna element 302d, which are adjacent to each other in the X-axis direction.

Additionally, detection port 305b, H polarization feed port 303c, and H polarization feed port 303d are collinearly or substantially collinearly disposed in the X-axis direction.

Detection port 305a is connected to one reference transceiver circuit 108, illustrated in FIGS. 1 and 2, which is shared to perform calibrations of H polarization systems of patch antenna elements 302a and 302b.

Similarly, detection port 305b is connected to one reference transceiver circuit 108, illustrated in FIGS. 1 and 2, which is shared to perform calibrations of H polarization systems of patch antenna elements 302c and 302d.

Detection port 306a is disposed in an intermediate position or a substantially intermediate position between patch antenna element 302a and patch antenna element 302c, which are adjacent to each other in the Y-axis direction.

Additionally, detection port 306a, V polarization feed port 304a, and V polarization feed port 304c are collinearly or substantially collinearly disposed in the Y-axis direction.

Similarly, detection port 306b is disposed in an intermediate position or a substantially intermediate position between patch antenna element 302b and patch antenna element 302d, which are adjacent to each other in the Y-axis direction.

Additionally, detection port 306b, V polarization feed port 304b, and V polarization feed port 304d are collinearly or substantially collinearly disposed in the Y-axis direction.

Detection port 306a is connected to one reference transceiver circuit 108, illustrated in FIGS. 1 and 2, which is shared to perform calibrations of V polarization systems of patch antenna elements 302a and 302c.

Similarly, detection port 306b is connected to one reference transceiver circuit 108, illustrated in FIGS. 1 and 2, which is shared to perform calibrations of V polarization systems of patch antenna elements 302b and 302d.

Thus, in the first example, four reference transceiver circuits 108 are provided.

Note that, the plurality of detection ports 305a and 305b may also be referred to as detection port(s) 305 when reference is made to all or a representative one of them. Similarly, the plurality of detection ports 306a and 306b may also be referred to as detection port(s) 306 when reference is made to all or a representative one of them.

For each of the transmission system and the reception system, reference transceiver circuit 108 connected to detection port 305a can sequentially perform calibrations of the H polarization systems of patch antenna elements 302a and 302b, as described above, using one of identical CAL code sequences generated by H-system Tx CAL code sequence generator 115a and H-system Rx CAL code sequence generator 114a, which are illustrated in FIG. 2. Alternatively, when the calibrations of the H polarization systems of patch antenna elements 302a and 302b are performed parallelly, different CAL code sequences are used for patch antenna elements 302a and 302b. As a result, accuracy of detecting an amplitude and phase deviation of the H polarization system between patch antenna elements 302a and 302b can be improved.

Similarly, reference transceiver circuit 108 connected to detection port 305b can sequentially perform calibrations of the H polarization systems of patch antenna elements 302c and 302d, using one of identical CAL code sequences. Alternatively, when the calibrations are performed parallelly, different CAL code sequences are used. As a result, accuracy of detecting an amplitude and phase deviation of the H polarization system between patch antenna elements 302c and 302d can be improved.

For each of the transmission system and the reception system, reference transceiver circuit 108 connected to detection port 306a can sequentially perform calibrations of the V polarization systems of patch antenna elements 302a and 302c, as described above, using one of identical CAL code sequences generated by V-system Tx CAL code sequence generator 115b and V-system Rx CAL code sequence generator 114b, which are illustrated in FIG. 2. Alternatively, when the calibrations are performed parallelly, different CAL code sequences are used. As a result, accuracy of detecting an amplitude and phase deviation of the V polarization system between patch antenna elements 302a and 302c can be improved.

Similarly, reference transceiver circuit 108 connected to detection port 306b can sequentially perform calibrations of the V polarization systems of patch antenna elements 302b and 302d, using one of identical CAL code sequences. Alternatively, when the calibrations are performed parallelly, different CAL code sequences are used. As a result, accuracy of detecting an amplitude and phase deviation of the V polarization system between patch antenna elements 302b and 302d can be improved.

Additionally, since the amplitude and phase deviations of the H polarization system and the V polarization system among patch antenna elements 302a, 302b, 302c, and 302d have a correlation, it is possible to more accurately detect the deviations among these four patch antenna elements.

Second Example

FIG. 7 is a perspective view illustrating another example of antenna substrate 301 of the antenna wireless device according to the second exemplary embodiment.

As illustrated in FIG. 7, detection ports 307a, 307b, 308a, and 308b including pad patterns having surface patterns changed in shape may be used instead of detection ports 305a, 305b, 306a, and 306b illustrated in FIG. 6.

Note that, the plurality of detection ports 307a and 307b may also be referred to as detection port(s) 307 when reference is made to all or a representative one of them. Similarly, the plurality of detection ports 308a and 308b may also be referred to as detection port(s) 308 when reference is made to all or a representative one of them.

Thus, with the surface pattern being changed in shape, an amount of coupling between the detection port and the feed port can be adjusted.

As described above, with the configurations of the first example and the second example of the second exemplary embodiment, the accuracy of detecting the amplitude and phase deviation between the adjacent patch antenna elements can be improved by providing the detection port to be shared between the adjacent patch antenna elements. For example, in a case where an array antenna is configured using patch antenna elements of two rows and two columns as a basic unit, it is possible to improve beamforming accuracy on a unit basis.

Third Example

FIG. 8 is a perspective view illustrating yet another example of antenna substrate 301 of the antenna wireless device according to the second exemplary embodiment.

In patch antenna element 302d in the example of FIG. 8, H polarization feed port 303d and V polarization feed port 304d are disposed with the same positional relationship as described in conjunction with patch antenna element 302d illustrated in FIG. 6.

H polarization feed port 303 and V polarization feed port 304 in each of patch antenna elements 302a to 302c in the example of FIG. 8 are also disposed with the same positional relationship as described in conjunction with H polarization feed port 303d and V polarization feed port 304d in patch antenna element 302d in the example of FIG. 8. That is, H polarization feed ports 303 and V polarization feed ports 304 in four patch antenna elements 302 are in a positional relationship of translation symmetry.

In the case where the positions of H polarization feed port 303 and V polarization feed port 304 in patch antenna element 302 are difficult to rotate as described above, as illustrated in FIG. 8, detection port 309a, detection port 309b, detection port 309c, and detection port 309d may be provided for H polarized waves, and detection port 310a, detection port 310b, detection port 310c, and detection port 310d may be provided for V polarized waves.

Note that, the plurality of detection ports 309a to 309d may also be referred to as detection port(s) 309 when reference is made to all or a representative one of them. Similarly, the plurality of detection ports 310a to 310d may also be referred to as detection port(s) 310 when reference is made to all or a representative one of them.

In the example of FIG. 8, detection port 309a, H polarization feed port 303a, detection port 309b, and H polarization feed port 303b are collinearly or substantially collinearly disposed in the X-axis direction.

Similarly, detection port 309c, H polarization feed port 303c, detection port 309d, and H polarization feed port 303d are collinearly or substantially collinearly disposed in the X-axis direction.

Additionally, detection port 310a, V polarization feed port 304a, detection port 310c, and V polarization feed port 304c are collinearly or substantially collinearly disposed in the Y-axis direction.

Similarly, detection port 310b, V polarization feed port 304b, detection port 310d, and V polarization feed port 304d are collinearly or substantially collinearly disposed in the Y-axis direction.

Then, detection port 309a and detection port 310a are connected to one reference transceiver circuit 108 illustrated in FIGS. 1 and 2.

Similarly, detection port 309b and detection port 310b are connected to one reference transceiver circuit 108 illustrated in FIGS. 1 and 2.

Similarly, detection port 309c and detection port 310c are connected to one reference transceiver circuit 108 illustrated in FIGS. 1 and 2.

Similarly, detection port 309d and detection port 310d are connected to one reference transceiver circuit 108 illustrated in FIGS. 1 and 2.

Thus, also in the third example, four reference transceiver circuits 108 are provided.

Third Exemplary Embodiment

Figure 9:
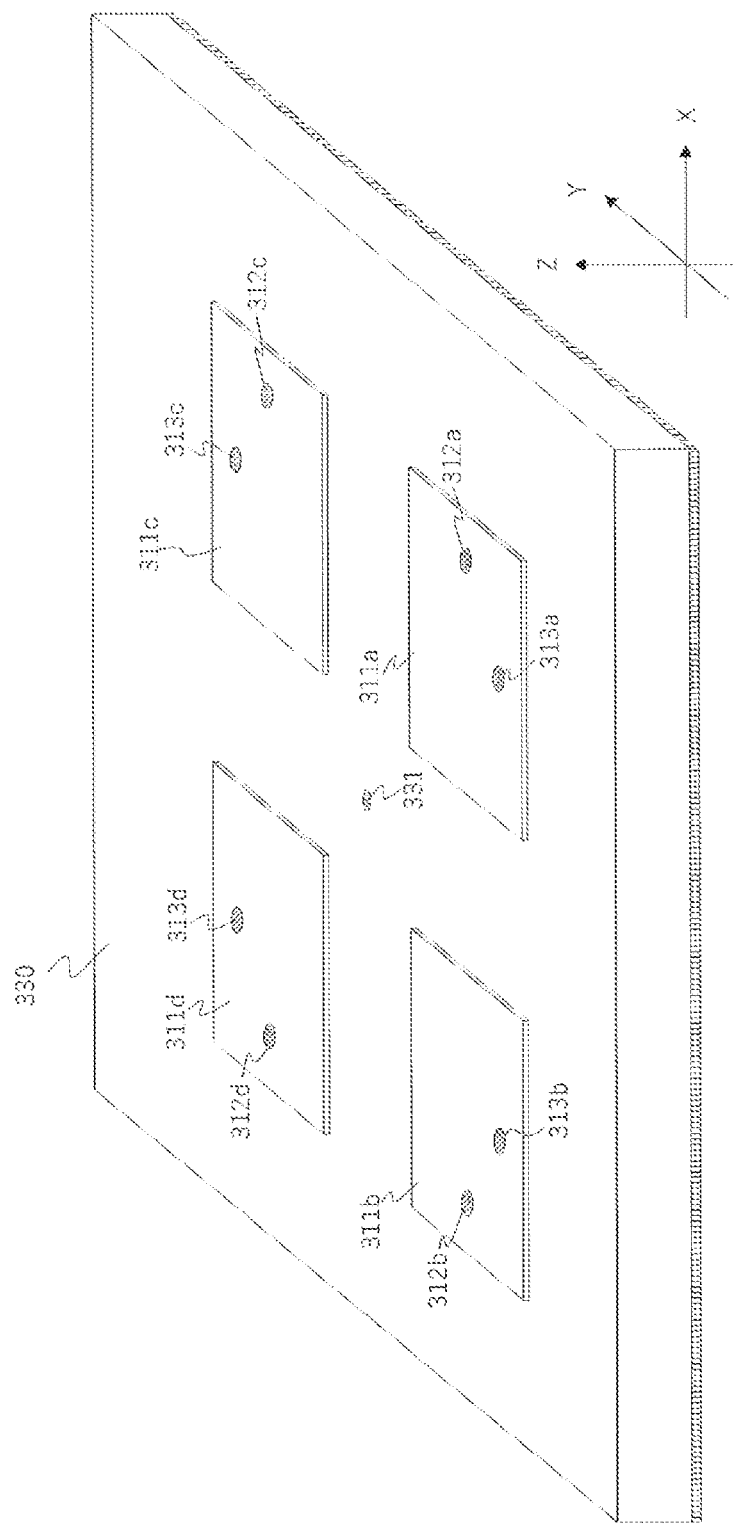
FIG. 9 is a perspective view illustrating an example of an antenna substrate of an antenna wireless device according to a third exemplary embodiment of the present disclosure.

With reference to FIG. 9, a description will be given of an antenna substrate of an antenna wireless device according to a third exemplary embodiment of the present disclosure. A description for the same components as those in the antenna wireless device according to the first exemplary embodiment will be omitted.

Also in the third exemplary embodiment, the number of the plurality of patch antenna elements is four. That is, both M and N are 2.

FIG. 9 is a perspective view illustrating an example of antenna substrate 330 of the antenna wireless device according to the third exemplary embodiment.

In the example of FIG. 9, antenna substrate 330 includes patch antenna element 311a, patch antenna element 311b, patch antenna element 311c, and patch antenna element 311d.

Note that, the plurality of patch antenna elements 311a to 311d may also be referred to as patch antenna element(s) 311 when reference is made to all or a representative one of them.

H polarization feed ports 312 and V polarization feed ports 313 in patch antenna elements 311 are disposed with the same positional relationship as described in conjunction with H polarization feed ports 303 and V polarization feed ports 304 in patch antenna elements 302 illustrated in FIG. 6.

Note that, the plurality of H polarization feed ports 312a to 312d may also be referred to as H polarization feed port(s) 312 when reference is made to all or a representative one of them. Similarly, the plurality of V polarization feed ports 313a to 313d may also be referred to as V polarization feed port(s) 313 when reference is made to all or a representative one of them.

Meanwhile, in the example of FIG. 9, antenna substrate 330 is different from antenna substrate 301 illustrated in FIG. 6 in that antenna substrate 330 further includes only one detection port 331.

Detection port 331 is disposed in an intermediate position or a substantially intermediate position among four patch antenna elements 311a to 311d, which are adjacent to each other in the X-axis direction and the Y-axis direction.

Detection port 331 is connected to one reference transceiver circuit 108, illustrated in FIGS. 1 and 2, which is shared to perform calibrations of H polarization systems and V polarization systems of four patch antenna elements 311a to 311d.

Thus, in the example of FIG. 9, only one reference transceiver circuit 108 is provided.

For each of the transmission system and the reception system, reference transceiver circuit 108 connected to detection port 331 can sequentially perform calibrations of the H polarization systems of patch antenna elements 311a to 311d, as described above, using one of identical CAL code sequences generated by H-system Tx CAL code sequence generator 115a and H-system Rx CAL code sequence generator 114a, which are illustrated in FIG. 2. Alternatively, when the calibrations are performed parallelly, eight different CAL code sequences are used. As a result, accuracy of detecting the amplitude and phase deviation of the H polarization system among patch antenna elements 311a to 311d can be improved.

Additionally, for each of the transmission system and the reception system, reference transceiver circuit 108 connected to detection port 331 can sequentially perform calibrations of the V polarization systems of patch antenna elements 311a to 311d, as described above, using one of identical CAL code sequences generated by V-system Tx CAL code sequence generator 115b and V-system Rx CAL code sequence generator 114b, which are illustrated in FIG. 2. Alternatively, when the calibrations are performed parallelly, eight different CAL code sequences are used. As a result, accuracy of detecting the amplitude and phase deviation of the V polarization system among patch antenna elements 311a to 311d can be improved.

As described above, with the configuration of the third exemplary embodiment, the number of reference transceiver circuits is reduced, and size reduction and power-consumption reduction are improved. Additionally, the deviations among the four patch antenna elements can be reduced by using one of identical CAL code sequences when calibrations are sequentially performed, and the beamforming accuracy can be improved.

Additionally, since the number of detection ports is reduced to one as a whole, the area efficiency of the antenna substrate can be improved.

In the above-described exemplary embodiments, the expression "—er/or" used for each component may be replaced with another expression such as "—circuit (circuitry)", "—assembly", "—device", "—unit", or "—module".

Although the exemplary embodiments have been described with reference to the accompanying drawings, the present disclosure is not limited to the examples. It is apparent that those skilled in the art could easily conceive of various changes or modifications within the scope of the claims. It is understood that such changes or modifications also belong to the technical scope of the present disclosure.

Further, the components in the exemplary embodiments may be combined as appropriate without departing from the gist of the present disclosure.

One exemplary embodiment of the present disclosure can improve beamforming accuracy of a phased array antenna, and is useful as a wireless communication device or the like that performs beam scanning. One exemplary embodiment of the present disclosure can also be applied to applications such as radar devices.

What is claimed is:

1. An antenna wireless device comprising:
 a plurality of antenna elements on a substrate;
 feed ports each associated with a corresponding one of the plurality of antenna elements;
 one or more detection ports each associated with a corresponding at least one or all of the plurality of antenna elements;
 transceiver circuits each connected to a corresponding one of the feed ports; and
 one or more reference transceiver circuits each connected to a corresponding one or a corresponding plurality of detection ports of the one or more detection ports,
 wherein
 for each antenna element of the plurality of antenna elements,
 a corresponding transceiver circuit of the transceiver circuits
  subjects a first signal to transmission processing including digital to analog conversion and up-conversion to generate a second signal, and
  feeds the second signal to a corresponding feed port of the feed ports,
   the corresponding feed port being connected to the corresponding transceiver circuit,
 the second signal fed to the corresponding feed port is output to a corresponding reference transceiver circuit of the one or more reference transceiver circuits through a corresponding detection port of the one or more detection ports,
  the corresponding reference transceiver circuit being connected to the corresponding detection port,
  the corresponding detection port being associated with the antenna element with which the corresponding feed port is associated,
 the corresponding reference transceiver circuit
  subjects the second signal to processing including analog to digital conversion and down-conversion to generate a third signal,
  detects a first amplitude and phase deviation based on the first signal and the third signal, and
  outputs the first amplitude and phase deviation to the corresponding transceiver circuit, and
 the corresponding transceiver circuit adjusts a phase and an amplitude of a transmission signal based on the first amplitude and phase deviation.

2. The antenna wireless device according to claim 1, wherein
 for each antenna element of the plurality of antenna elements,
 the corresponding reference transceiver circuit
  subjects a fourth signal to processing including digital to analog conversion and up-conversion to generate a fifth signal, and
  feeds the fifth signal to the corresponding detection port connected to the corresponding reference transceiver circuit, the fifth signal fed to the corresponding detection port is output to the corresponding transceiver circuit through the corresponding feed port, the corresponding transceiver circuit being connected to the corresponding feed port, the corresponding feed port being associated with the antenna element with which the corresponding detection port is associated, and the corresponding transceiver circuit
subjects the fifth signal to reception processing including analog to digital conversion and down-conversion to generate a sixth signal,
detects a second amplitude and phase deviation based on the fourth signal and the sixth signal, and
adjusts a phase and an amplitude of a reception signal based on the second amplitude and phase deviation.

3. The antenna wireless device according to claim 2, further comprising:
a first code sequence generator which, in operation, generates a first code sequence; and
a second code sequence generator which, in operation, generates a second code sequence,
wherein
the first signal is the first code sequence generated by the first code sequence generator,
the corresponding reference transceiver circuit detects the first amplitude and phase deviation based on a correlation between the third signal and the first code sequence,
the fourth signal is the second code sequence generated by the second code sequence generator, and
the corresponding transceiver circuit detects the second amplitude and phase deviation based on a correlation between the sixth signal and the second code sequence.

4. The antenna wireless device according to claim 1, wherein
the substrate includes an antenna pattern on a top surface of the substrate and a ground (GND) plane on a bottom surface of the substrate, and
each of the one or more detection ports includes a through via hole between the antenna pattern and the GND plane, the through via hole separating the detection port from the antenna pattern on the top surface of the substrate.

5. The antenna wireless device according to claim 1, wherein
the substrate includes a multilayer substrate,
the substrate includes an antenna pattern on a top surface of the substrate and a ground (GND) plane on a bottom surface of the substrate, and
each of the one or more detection ports includes an inner via hole between the multilayer substrate and the GND plane, the inner via hole separating the detection port from the antenna pattern.

6. The antenna wireless device according to claim 1, wherein
the substrate includes an antenna pattern on a top surface of the substrate and a ground (GND) plane on a bottom surface of the substrate, and
each of the one or more detection ports is disposed on the GND plane, and is separated from the antenna pattern.

7. The antenna wireless device according to claim 1, wherein each of the one or more detection ports is disposed in a substantially intermediate position between corresponding two antenna elements of the plurality of antenna elements, the corresponding two antenna elements being adjacent to each other.

8. The antenna wireless device according to claim 7, wherein each of the one or more detection ports includes a pad pattern.

9. The antenna wireless device according to claim 1, wherein
each of the plurality of antenna elements is associated with
a first feed port for a first polarized wave,
a second feed port for a second polarized wave,
a first detection port for the first feed port, and
a second detection port for the second feed port.

10. The antenna wireless device according to claim 1, wherein
the plurality of antenna elements include four antenna elements arrayed two by two in a rectangular grid form, and
one of the one or more detection ports is disposed in a substantially intermediate position among the four antenna elements, and is associated with the four antenna elements.

* * * * *